United States Patent
Federa et al.

(10) Patent No.: US 7,395,394 B2
(45) Date of Patent: Jul. 1, 2008

(54) COMPUTER OPERATING SYSTEM WITH SELECTIVE RESTRICTION OF MEMORY WRITE OPERATIONS

(75) Inventors: Norbert Federa, Moedling (AT);
Michael Scaife Gibson, Hinterbruehl (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 11/347,692

(22) Filed: Feb. 3, 2006

(65) Prior Publication Data

US 2007/0186070 A1  Aug. 9, 2007

(51) Int. Cl.
*G06F 12/14* (2006.01)

(52) U.S. Cl. .................... 711/163; 711/152; 726/26; 726/27

(58) Field of Classification Search .................. None
See application file for complete search history.

(56) References Cited

U.S. PATENT DOCUMENTS

| | | | |
|---|---|---|---|
| 6,996,706 B1 * | 2/2006 | Madden et al. | 713/2 |
| 2003/0140238 A1 | 7/2003 | Turkboylan | |
| 2004/0049645 A1 | 3/2004 | Lee et al. | |
| 2005/0027957 A1 * | 2/2005 | Page et al. | 711/163 |
| 2005/0044548 A1 * | 2/2005 | Page | 718/100 |
| 2006/0265756 A1 * | 11/2006 | Campbell et al. | 726/26 |
| 2006/0282896 A1 * | 12/2006 | Qi | 726/25 |

OTHER PUBLICATIONS

Microsoft, Windows XP EWF Overview; Last updated Sep. 21, 2004.

* cited by examiner

*Primary Examiner*—Than Nguyen

(57) ABSTRACT

A computer system and method that are useful for embedded operating systems, thin client computing applications and the like, protects memory blocks in a nonvolatile version of the system program used at startup (reboot), for example in flash memory. Write operations to protected memory blocks are intercepted. A potentially revised version of any attempted re-written block is maintained in RAM and can be revised further during runtime, the original protected block remaining unwritten. A restriction process flags when or whether a revised block in the RAM is to become permanent. During a write operation or at orderly system shutdown, the revised blocks that were marked are written over the protected blocks in the nonvolatile version. The process can be embodied using file and directory attributes in variably sized Ramdisk virtual drive in a Windows XP-embedded system, providing processes with read access to the original protected block as well as the revisions, enabling configuration changes and software installations without multiple reboots.

21 Claims, 3 Drawing Sheets

COMPUTER OPERATING SYSTEM WITH SELECTIVE RESTRICTION OF MEMORY WRITE OPERATIONS

FIELD OF THE INVENTION

The invention concerns a computer operating system and method, particularly for thin client and embedded operating system configurations, wherein changes to files are selectively discarded or made permanent in nonvolatile memory for access after a subsequent restart.

A dynamic memory overlay is established in RAM after a restart, and write operations are intercepted such that rewritten files are placed in the overlay. Rewritten files in the overlay can be committed to become permanent or not, on a selective basis, and permanent files are written to nonvolatile memory during orderly shutdown procedures.

The invention can be embodied, for example, using a Ramdisk driver in Windows XP for establishing a RAM overlay with a variable amount of space and file attribute management for committing to permanent changes.

BACKGROUND

Computing devices include nonvolatile memory containing information used when rebooting, and volatile memory that is changed dynamically during operations. Thin client and embedded operating systems often restart from nonvolatile memory in the form of flash memory. Particularly for flash memory but also for other forms of nonvolatile memory such as hard disk partitions, memory access is relatively slower than directly addressable volatile RAM. For some purposes, executable code may be provided in addressable read-only memory, but in large part, executable code and other operating particulars are loaded from the nonvolatile memory to RAM during startup operations and directly addressed in the RAM by a central processing unit at runtime.

Limited use is made of the nonvolatile memory, which is less convenient and typically slow, and is used to store values that are less frequently changed. It also may be prudent to limit the extent to which operating system files can be changed freely. Values stored in nonvolatile memory devices, such as a disk partition or a flash memory, have the important aspect that their values are not lost when the system is powered down. Nonvolatile memory is used to store a starting version of the system, including executable code and parameter values that are to govern operation when the system is restarted. It is advantageous to have a capability to alter the contents of the nonvolatile memory, for making relatively long-lived or permanent changes, such as configuration changes, installation of new or revised versions of executable code, and otherwise setting memory contents that will be infrequently changed.

One technique is to provide in volatile RAM a block of data that stores a version or image of the nonvolatile memory contents in which changes can be made. The block in RAM can be changed during runtime operations, with appropriate programming regulating the extent to which changes are permitted. At some point, the block in RAM is written over the corresponding block in the nonvolatile version so that the changes appear at the next system restart, i.e., to make the changes permanent. In the case of a flash memory, which takes some time to write, a regular orderly shutdown procedures can do the step of writing the revised version from the block in RAM to the flash memory. Except in the case of a catastrophic shutdown such as a power failure, wherein the orderly shutdown procedure cannot be completed, changes made to the operating system can become permanent in the flash memory in this way.

It is a programming issue to decide how freely operational changes might be permitted. Certain file attributes can be associated with memory files to define them as hidden or write protected, etc. Files with particular attributes can be made accessible only to processes with a given set of authorizations, and only certain processes might have the necessary rights to alter file attributes. Setting up and regulating changes are generally programming choices.

The Microsoft Windows XP-embedded system has a software aspect known as the Enhanced Write Filter ("EWF") by which changes to be made to a block of nonvolatile memory of an embedded operating system, for example a flash memory, can be controlled. The EWF feature controls whether or not the changes that are accumulated in an image of the block in RAM will be written to the flash memory during orderly shutdown procedures, and thus made permanent for use at the next reboot. The EWF feature either permits the entire block to be written or prevents the entire block from being written. EWF lacks a selective commit applicable to make permanent only certain selected files, or subdirectories or other categories of information in the block, which may have changed is size or position. Otherwise, changes in RAM are either committed to all become permanent (at least insofar as being written to nonvolatile memory so as to survive the next restart), or none are committed. EWF since Service Pack 2 (SP2) can selectively commit files, but only if their size and position has not changed.

Memory management is an important issue in so-called thin client computer systems, which preferably comprise terminal devices having a limited nonvolatile flash memory as opposed to a hard disk. Much of the programming to be operated via the thin client terminal device is run at a server that serves a network of thin clients. The programming at the terminal device in part is for accessing the server, and in part is to run code that is obtained from the server.

A number of models of thin client computer systems, including systems using the Windows XP-embedded systems "XPe"), are distributed by Neoware Systems, Inc., King of Prussia, Pa. Although such systems use nonvolatile read/write data storage such as flash memory to coordinate execution of software at a server, it still occurs that changes to programming and configuration of the client terminal may be needed from time to time. Hardware reconfigurations, new versions of software and changes in user rights might provide reason to reprogram all or part of the flash memory. In some situations, such changes are made under remote management from the server and/or a network administrator. It is helpful if remote changes can be implemented without immediately committing either to discard or to keep all of the changes at the next system restart (generally termed a "reboot") and preferably without the need to reboot to effect the changes in the first place.

The Neoware Windows XPe configuration can support many features including Web applications such as full browser operation with the ability to support plug-ins, COM objects, JVM Adobe Acrobat, Macromedia Flash, and ActiveX. Neoware XPe thin clients are resistant to viruses and worms because applications run on the server, not the desktop. Management options include Neoware's ezRemote Manager, IBM Tivoli, Altiris Deployment Server, and Microsoft Systems Management Server 2003 (SMS). In these systems, the client terminal is typically provided with a moderately substantial flash memory, for example, 256 or 512 megabytes, which is nonvolatile and stores executable code downloaded from the server. For example, the code contains overlays that are written to RAM when needed for execution of associated operations. The flash memory also has memory locations available for storage of system setup parameters.

According to choices made in programming, a computer system might be programmed to permit alteration of executable program segments and constants stored in a nonvolatile read/write memory on disk or flash media or otherwise. Alternatively, the computer system might be programmed to limit the extent to which programs and constants are alterable. Using hardware, a computer system might employ a read-only memory (ROM) device for executable instructions and/or constants that need to survive a restart, together with a random access memory for values that are to be changeable and need not survive a restart.

If all the parameters needed to initiate a system are stored in a nonvolatile way, and the contents of the volatile RAM are lost when the system is powered down, the system will restart very dependably, always in the same way. However, such a system is not reconfigurable. It is advantageous to provide data values that can be changed, but can survive a restart.

A typical computer for business and personal use employs a combination of more or less volatile storage. On a hardware level, there may be circuit board jumpers physically placed to make selections among supported options. An initial bootstrap loading routine is provided in read-only storage and defines initial instructions upon startup. The basic input output system (BIOS) may be stored in a set of nonvolatile registers such as a flash memory in a way that permits changes to be made but only during a startup procedure that precedes loading of the main operating system. The executable system software is loaded from disk and typically is hierarchical, with an operating system such as Window XP containing programming and constant values is a system registry, used to oversee and control the execution of applications programs. On another level, sometimes there are plural defined sets of user preferences. Changes made to the system may need to be made above the user preference level so as to affect all users, or below that level to affect only the requesting user.

In any event, it is advantageous from time to time to make changes, for example when reconfiguring a system, when changing hardware configuration and the like, and it is advantageous to protect the system and its setup. The Windows XP system has a System Restore feature wherein sufficient information is stored on a system disk to wholly define a previous setup. If a user makes a change and the results are less than expected, the user has the option to revert to a previous setup. The user can continue to experiment with alternative changes, reverting to a previous setup as necessary, until the desired results are obtained.

The Windows embedded XP system (XPe) has a feature identified as the enhanced write filter or "EWF." This feature resembles System Restore in a way applicable to embedded systems and is used to undo the effect of memory-write operations. The actual write operations are made only logically during runtime by a processor to a memory buffer area, and not irrevocably to the flash or other memory of the Windows embedded XPe system. A flash memory is writable but the write process is slow, such that the flash memory has attributes much like a programmable read only memory. This enables the system to operate as if the flash memory is a read/write RAM. At some point, such as at orderly shutdown, the memory buffer area is copied over the flash memory and becomes the new nonvolatile system memory that is used during the next system restart. The EWF feature allows the operating system to choose whether the changes made to the buffer will be copied over the flash memory or discarded, in which case the next system restart will be the same as the last one.

To invoke the Windows EWF feature, an image of the flash memory (or other protected memory block) is stored as an overlay in a RAM buffer. Memory read and write operations that are to be directed to the protected block are redirected to the overlay. During programmed operations, the contents of the affected memory locations may change in the buffer but not in the protected memory block in the flash.

Assuming that the protected block stored system configuration information or executable code, the contents are likely to be changed only in certain situations, such as a change of configuration, the installation of new or revised software, etc. Nevertheless, it is advantageous to have a way to make changes to these portions. The EWF feature is intended to facilitate such changes but not to make the changes lightly. At some point in operation, such as during a shutdown procedures, the contents of the memory buffer are copied over the protected block, or by software selection are specifically not copied and thus are discarded. In this way, the EWF feature permits the XPe operating system either to accept or decline changes made between the original condition of the protected block as copied into the memory buffer, and the final condition after running for a time and possibly making configuration changes.

The option in XPe-EWF to make memory changes permanent is useful to limit the extent to which memory content changes can be made accidentally, e.g., as a result of programming errors or anomalous conditions. At the same time, the system has the ability when necessary to make intended setup changes. This arrangement is intended to provide many of the dependability advantages of a permanent and unchangeable read-only version of the memory image, and also to permit revisions to the setup.

In an operating system that is to be reconfigured, changes to the setup often require one or more reboots. Restarting may be needed to revert to a more basic system level and obtain a clean state from which changes can be made. If unsuccessful, in a disk operating system with a Restore function, restoring to an earlier operating system setup is possible and also requires a reboot, whereupon the complete previous setup is re-initiated. In an EWF XP-embedded system, one can choose not to write the memory buffer overlay, but this reverts completely to the previous setup with the next restart, instead of providing a way to access the old and new versions. What is needed is a better way to manage a protected memory block.

It would be an advantageous and substantial improvement on operating systems, including the EWF write-limited procedure discussed, if techniques could be provided whereby more options were made available to deal with the use of a flash memory or other non-volatile read/write memory device to make permanent some setup or other data value changes and not others.

SUMMARY OF THE INVENTION

It is an aspect of the invention to maintain a data structure to control the writing of updated data to a nonvolatile memory, non-limiting examples of the data being new configuration data or new executable code, wherein criteria are applied by the operating system and/or an administrator or other technique or operator, so as to permit a selected subset of the data that has been updated to become permanently written.

It is another object of the invention to retain access to the original setup information from the protected block and also have access to revised configuration data or code.

Another object is to integrate an improved memory block protect feature into popular operating systems such as Windows XP-e, which has registry information, file naming and file attribute conventions, disk drive mapping provisions, a disk drive Ram emulation provision (Ramdisk), a tentative file moving process in the defragmentation process, and other software capabilities that can be advantageously applied to deal with memory block protection issues.

It is more particularly an aspect of the invention to provide a technique for protected writing to memory in an embedded operating system, such as from a RAM register such as a defined RAM drive, to a nonvolatile memory such as a flash memory, a selectively windowed subset of the contents of the RAM drive. According to the invention certain selected portions of potentially updated data can be committed to be written to the nonvolatile memory and to become permanent and valid during a subsequent startup from the nonvolatile memory. Other portions of potentially updated data are blocked from writing and the values of these portions revert to their values as of a previous startup.

Categories of files or values that are to be committed to be changed or not changed might be ranked from values that critically affect operating system functions, to important but less critical values such as virus definitions that need to be protected while being rewritten on a more frequent basis, to values that can be changed relatively freely such as optional selections that the user can easily re-select. By using the capability provided by the present invention and a restriction manager process, it is possible to vary the freedom with which operational changes can be made, in inverse relation to the potential risk of an error or security breach from ill conceived changes.

The invention can be embodied, for example, by replacing the Ramdisk driver for Microsoft Windows XP embedded with a system including a Restriction Manager as disclosed herein, operative together with a nonvolatile memory device of at least limited capacity, such as a flash memory. An aspect of the invention is that the Restriction Manager can selectively define particular parts of the data that might be written to the nonvolatile memory as permitted, and other particular parts of the data are not to be written, thereby permitting different levels to which elements of the operating system, applications, tables and the like can be changed.

These and other objects and aspects are provided according to the invention in a computer system and method that are useful for embedded operating systems, thin client computing applications and the like, protects memory blocks in a nonvolatile version of the system program used at startup (reboot), for example in flash memory. Write operations to protected memory blocks are intercepted. A potentially revised version of any attempted re-written block is maintained in RAM and can be revised further during runtime, the original protected block remaining unwritten. A restriction process flags when or whether a revised block in the RAM is to become permanent. During a write operation or at orderly system shutdown, the revised blocks that were marked are written over the protected blocks in the nonvolatile version. The process can be embodied using file and directory attributes in variably sized Ramdisk virtual drive in a Windows XP-embedded system, providing processes with read access to the original protected block as well as the revisions, enabling configuration changes and software installations without multiple reboots.

BRIEF DESCRIPTION OF THE DRAWINGS

There are shown in the drawings certain exemplary and nonlimiting embodiments of the invention as presently preferred. Reference should be made to the appended claims, however, in order to determine the scope of the invention in which exclusive rights are claimed. In the drawings.

DETAILED DESCRIPTION OF PREFERRED EMBODIMENTS

Figure 1:
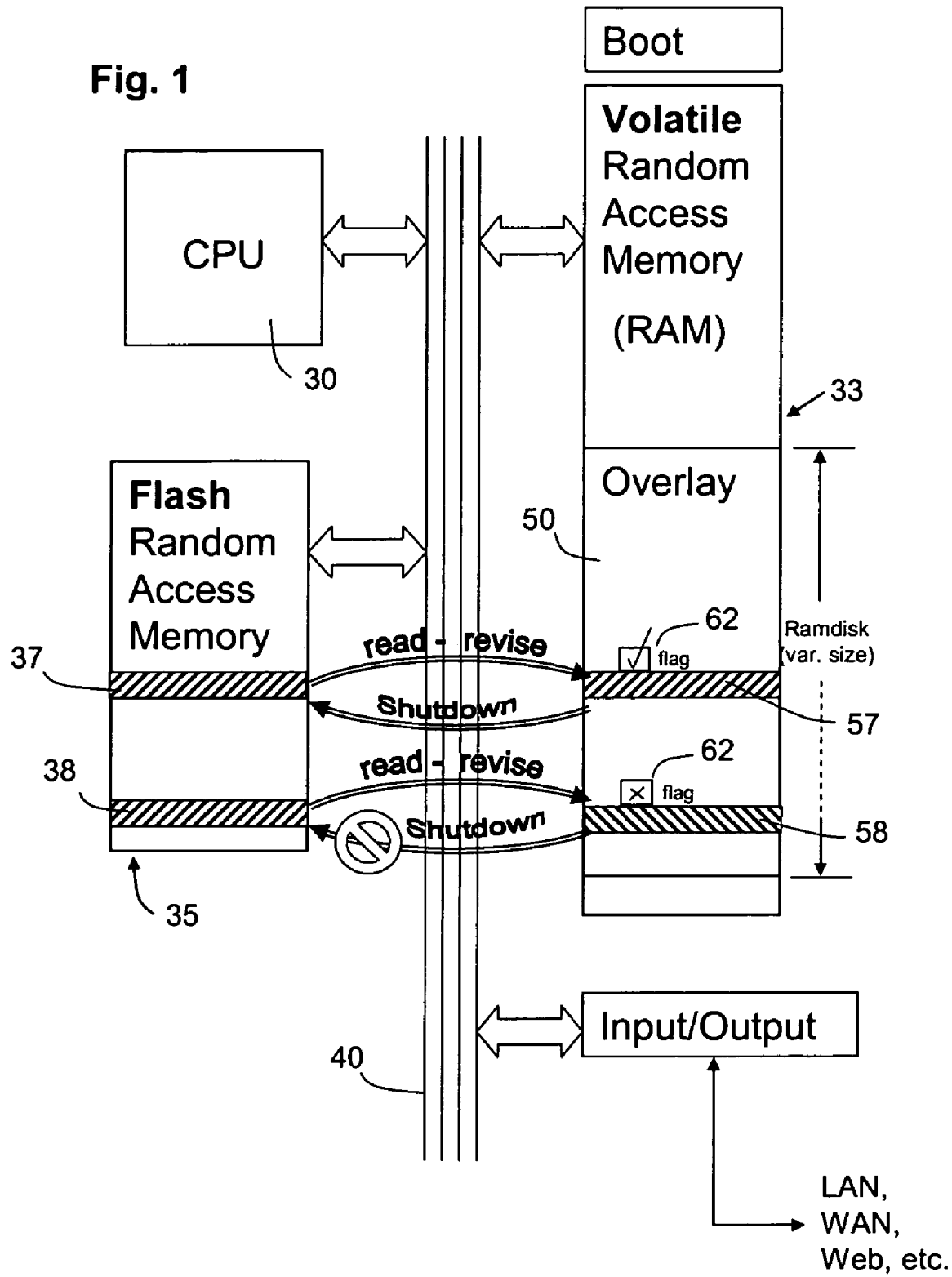
FIG. 1 is a block diagram illustrating a data processing configuration according to an exemplary embodiment of the invention, wherein an inventive write filter process selectively distinguishes memory blocks in an overlay, which blocks are to be written to nonvolatile memory versus other blocks that are to be write protected.

Referring to FIG. 1, a data processing configuration is provided according to the invention with a protected memory block, such as configuration data, executable code read from a flash memory 35 for use during system restarts. In this nonlimiting exemplary embodiment, the configuration advantageously can involve an embedded operating system such as a thin client computer terminal device. In such a device, instructions and data values that are used and/or manipulated by a central processing unit 30 of the device, are derived from nonvolatile memory 35 at system startup.

These instructions and data values include executable software instructions, stored system parameters such as constants, flags and the like, and all the other values that are accessible to the central processing unit while executing programmed instructions. In a thin client environment, much of the code that is used is provided by or actually is executed by a remote server (not shown) in communication with the terminal over a local or wide area network. It is efficient in such an environment not to provide large memory devices such as hard drives, which are less necessary than in an environment where code is stored and executed locally at the terminal.

Operation of the terminal, like any digital computer, involves successively accessing and stepping through memory addresses that store digitally encoded instructions or steps. These include register manipulation instructions (e.g., arithmetic, logical or shift instructions), memory reference instructions (reads and writes with optional compound or indexed addressing), jumps to subroutines at identified memory addresses and various other procedures.

Memories can be alterable or read-only. The memory locations that might be accessed during operation of the system include read-write locations loaded with values at initial system startup, for example copied from a nonvolatile store or generated by operation of the CPU 30 or possibly downloaded from a server, during initial operations after initializing the terminal device. If the source information doesn't change, the device starts with the system in the same original state each time it is initialized.

For a thin client terminal device or other embedded operating system computer, it is advantageous to provide a nonvolatile memory for reference to at least part of the startup information needed. Advantageously, however, the startup information is variable from one terminal device to another to service various needs or preferences of the operators of the particular terminal.

Information that may differ among terminals but is advantageously stored in a nonvolatile memory, such as a flash memory in a thin client application, may include, for example, codes representing hardware configuration parameters. Such parameters normally would be fixed but conceivably could need to be changed, e.g., when changing hardware coupled to the terminal (e.g., printers, optical scanners, etc.), when installing updated or improved drivers or other software, and so forth. Apart from hardware, software configuration parameters might be specific to conform to user choices that are to survive a system restart, or perhaps system administrator choices for terminal authorizations. Other stored parameters that might usefully survive a restart are terminal name information, network addresses, and other identification codes and the like. It is advantageous to have changeable codes of this type stored in a flash or other nonvolatile memory to that the values can be set, at least with reasonable convenience and will remain in place as the system is powered down and restarted (rebooted).

A typical nonvolatile flash memory has a relatively slow write access time compared to directly addressed volatile RAM. In a system where nonvolatile memory comprises a hard drive, access also takes time, e.g., to initiate a block transfer through a driver and hardware interface must wait for a disk to position read/write heads. The relative slowness and inconvenience of writing to flash memory are such that programmers who are configuring embedded systems for thin client devices and the like, typically attempt to minimize the amount of flash memory provided and also minimize the incidence of writes to the flash memory.

The flash memory is primarily used at startup time to bootstrap load and configure an operating system that for the most part runs in volatile RAM. In one embodiment, the embedded system comprises a moderately sized volatile RAM, for example at least 192 megabytes, and in more capable terminals up to 512 megabytes or more. This memory is coupled to a system bus and is accessible for read/write access at high speed. The embedded system can be, for example, a Windows XP-e system (i.e., "XP-embedded").

The embedded system, for example, in the context of a thin client application, does not include a hard drive. In order to operate the system using conventional programming for file and directory naming and read/write access as volatile storage area that persists only until power-down or reset, a portion of the volatile RAM is defined as a Ramdrive, i.e., configured to emulate a letter drive and potentially networked mapped disk memory, but containing volatile memory only.

The operating system is provided with a procedure, for example operable during orderly system shutdown, wherein at least one content variable portion of the memory is written from the volatile memory to the nonvolatile flash memory. According to an inventive aspect and unlike the extended-write-filter protection now available in Windows XP-e, the present system comprises an operating system that contains data for selectively defining some portions of the writeable nonvolatile flash memory as being writeable, whereas other portions are selectively defined as write filtered.

The values or categories of values that might selectively be defined as writable or not writable are typically configuration defining values, administrator defined authorizations, and user selection. The variable values might consist, but need not consist, of executable code, as opposed to tables of constants and flags.

During system startup, the operating system is derived from the previously stored (nonvolatile) data in the embedded system memory, typically in flash memory. During operation, the system develops and potentially revises an overlay for the flash memory. As operation proceeds, the overlay and not the original flash memory data, provide the data values and parameters that govern operation. When an orderly shutdown is to occur, a procedure is invoked wherein the overlay, as revised during operation, is to be written back into the flash memory.

According to the invention, a first additional step during system configuration is selectively to define categories of stored values (e.g., by noting the type or memory address of such values) that shall be writable from the overlay onto the flash memory, and other categories that shall be blocked from being written back to the flash memory.

The invention is applicable to various software products and operating systems. In the examples discussed, the invention is applied for example to certain popular Microsoft products, including current derivatives of Windows XP and Windows 2003. A particularly useful application of the invention is to Windows XP embedded systems, as used for thin client and other applications wherein there is an effort to minimize the hardware, complexity and expense of a terminal device such as a user terminal.

FIG. 1 schematically illustrates operational elements of a computer system including a central processing unit (CPU) 30, a first memory 33 containing volatile memory, illustrated as a RAM that is directly addressable over a system bus 40, and a second memory 35 containing nonvolatile memory such as flash memory. For purposed of illustration, the flash memory is also shown in communication over the common bus 40 but might also be connected to other elements such as one or more input/output elements 42. Various other elements such as power supply elements and the like, serial and parallel communication ports, etc., are conventionally included have been omitted to simplify the illustration.

Figure 2:
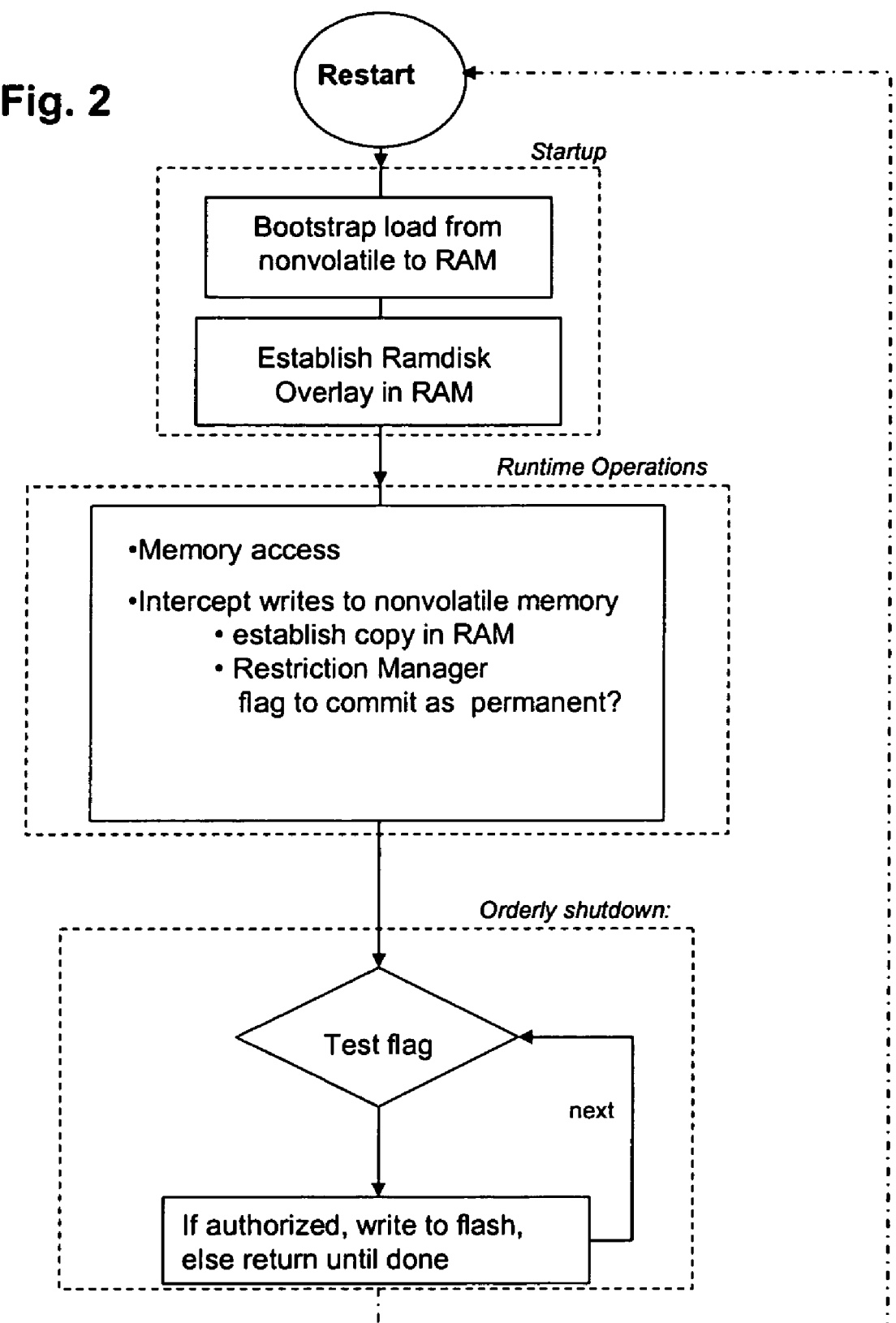
FIG. 2 is a block diagram showing an exemplary embedded operating system such as a thin client terminal.

FIG. 2 illustrates in flow chart form certain steps taken according to the invention during startup, including establishing an overlay area 50 in the RAM 33 for storing copies of files or blocks that during runtime may be read from the nonvolatile memory, e.g., flash 35, and which are rewritten and potentially changed. These files are flagged by the Restriction Manager process operable during runtime, as committed to being permanent or as not committed. During a write procedure, for example during an orderly shutdown, only the files or blocks that have been flagged to become permanent are written. These files are a subset of all the files or blocks that may have been written, allowed discrimination by the Restriction Manager against making permanent changes of selected categories.

The invention is applicable to any volatile/non-volatile-writeable memory combination, including a system with a RAM and hard drive but is particularly useful in a thin client application because in such an application a hard disk drive can be omitted in favor of a flash memory for storing a limited complement of program code as well as various tables, databases, setup configuration parameters and the like.

The CPU 30 contains various registers and gates to effect instructions for memory access (reads and writes), internal register manipulations, jump instructions, etc. based on each successive instruction selected by a program counter when stepping through memory locations or when jumping to a memory location. When the device is powered up, reset of the program counter may initiate operation at a memory area 44 containing a bootstrap loading routine. This routine operates in known manner to load setup routines from the nonvolatile memory 35 into the RAM 33, which in turn initiate system operation.

According an inventive aspect, an overlay area 50 is reserved in the RAM during system startup and made available to be loaded with at least part of the contents of the nonvolatile flash memory 35 from time to time during runtime. It is possible but not necessary to load the overlay with a complete version of the nonvolatile memory 35 during startup, whereupon the overlay contains a clean version of the operating system (i.e., a starting version of executable code, tables and/or constants). According to a preferred embodiment explained in more detail below, it is also possible to use file management procedures to store in the overlay area 50 only files or other memory blocks to which an attempt has been made during runtime to write values to such files or blocks. It is presumed that if the file or block is being written, its values may have changed compared to the original values. In any event, according to an inventive aspect, a copy of the changed file or block is maintained in the overlay area 50.

It may be desirable to alter the files or blocks more than once. The versions of the files or blocks in the overlay 50 can be changed repeatedly during runtime, optionally subject to supervisory authorization or other limitations provided for by the software operating system. The overlay 50 provides an alternative version or volume of the operating system that was originally provided by the nonvolatile flash memory 35, plus changes and updates.

Preferably, the contents of the flash memory 35 remain readable, providing a source from which reference can be made to values before the overlay 50 was revised. Thus if necessary or desirable, the system can revert to the original operating system executable code, tables and constants during runtime, namely by recopying the original files of blocks into overlay 50. According to another embodiment, the original contents can be made inaccessible and the contents of the overlay 50 used as the official authoritative version of the respective files.

At system shutdown time (at least for an orderly shutdown), revisions that are made to the overlay 50 can be written back to the nonvolatile flash memory 35. As discussed, writing to the flash memory may be slow or otherwise aptly reserved for a time when there is little or no interference with the operation of the terminal device. Once the revised contents are written from the revised overlay to the flash memory, then the flash memory contents become the clean version that will be loaded in any subsequent restart.

According to an inventive aspect, the foregoing procedure is arranged so that only a subset of the changed content in overlay 50 is written to the nonvolatile flash memory during a write to memory procedure. Instead, writing to the flash memory is conditional on whether the system has committed to making changes permanent in the flash memory as to a subset of the contents of the overlay. A selective commit is possible on a level of individual memory values or files or blocks of values in the overlay.

Referring to FIG. 1, if a read-revise-write sequence is undertaken (according to programmed system steps), the occurrence of a write operation may be such that the contents of memory blocks 37, 38 have been manipulated and potentially changed. Accordingly, and keyed by the occurrence of the write operation, the written contents are stored in corresponding files or blocks 57, 58 in overlay 50, whereas the unchanged versions 37, 38 remain in the flash memory 35.

The attributes associated with the written files or blocks 57, 58 include flags 62 of one or more bits, intended to encode the extent to which the revised files or blocks 57, 58 are committed to become permanent changes in the nonvolatile flash memory 35. At least a go/no-go commitment is encoded by flags 62, and potentially additional bits can be used to encode other information about the changed files or blocks, for example determining a level of commitment having two or more levels. The flags 62 are set or not set according to a restriction manager associated with the file management system, shown in flow chart form in FIG. 2. The restriction manager is a step ~.

The system can be embodied in a Window XP or Windows 2003 system with embedded Windows XP, for example, by providing routines to be run in lieu of the Microsoft Enhanced Write Filter for Windows XP embedded (known as the "EWF" feature, and in lieu of the Microsoft Ramdisk driver for Windows XP embedded. According to a further aspect, an additional routine is provided to operate as a Restriction Manager. The Restriction Manager is configured to classify particular contents of the overlay 50 as committed to be written to the nonvolatile flash memory at shutdown time, or to be blocked from being written. The Restriction Manager classifications can operate according to the procedural steps shown in the flowchart of FIG. 2. The Restriction Manager can maintain a database whereby a subset of the contents of overlay 50 are flagged as being temporary only or selectively committed to be written to the nonvolatile flash memory 35. The subset of temporary or selectively committed memory values preferably are distinguished and flagged in the Restriction Manager database by one or more of the type or category of information in the contents or the associated file name or identifier, or the memory address of the content or by other techniques wherein information to be written to the flash memory 35 at shutdown can be distinguished from information that is not to be written to the flash memory 35 at shutdown.

In this way, the invention provides a hyper-write filter ("HWF") process that can be used to protect a volume such as nonvolatile flash memory 35 from memory writes. Preferably, each HWF-protected volume has an associated overlay 50. Any writes that might be directed to the protected volume (e.g., flash memory 35) are redirected by the run time software to the associated overlay 50. These writes are effectively cached in the overlay during runtime, whereas the protected volume remains pristine. However the written values are accessible from the software and the original pristine values are available as well, namely by reading from the protected volume. and made available as part of the volume.

The overlay 50 is maintained in the random access memory 33. If and when it is desired to commit permanently to the contents of the overlay, the data stored in the overlay may be flagged as committed to the protected volume (flash 35). However, the invention does not require that the entire overlay be committed or not. The commitment can be specific to particular portions of the overlay (and thus the corresponding portions of the nonvolatile memory) where changes can be effected under control of the Restriction Manager.

The particular portions of memory that the Restriction Manager permits to be written or for which permanent write operations are blocked, is a matter of programming choices and various specific choices are possible, based upon the gravity of potential problems or other concerns that might be associated with the changes. For example, in connection with changes to the applications Registry, it is possible that installation of a new applications program or changes to a Registry entry in view of updates that have been tried and proven, e.g., on other similar terminal devices, could be considered safe and made permanent when entered. Before that point, untried revisions might be tested for a time or for a number of repetitions. This technique for proving revisions prior to making them permanent can be managed by the operating system of the client terminal device in association with testing or with the cooperation of a remote systems administrator (not shown).

According to another advantageous aspect, the invention introduces the concept of dynamic overlay. As discussed above, the Restriction Manager according to one aspect can distinguish files or memory addresses or categories of content as being approved for writing to permanent flash memory, or blocked from being written and thus lost at the next restart. Among other provisions, the invention includes the possibility of deleting files or content stored in certain memory addresses or content. The Restriction Manager and write filter as described are part of the Ramdisk driver that devotes a portion of RAM to emulation of storage in a disk operating system. When a file is deleted and appropriate entries made in the file allocation tables for the Ramdisk emulation, the associated memory space is released. Provided the change is made in a manner that is to designated as a permanent change in the overlay, the memory space becomes available for storage of other data. This makes efficient use of the overlay data capacity and potentially greater capability for the computer terminal device as a whole.

According to the selective-commit aspect, the inventive system provides an option as to whether changes made in the overlay 50 are to be designated as permanent or tentative. Preferably, the selection of making changes permanent or tentative is provided on the levels of specific files, folders or subdirectories, and even parts of the Windows registry.

The selective-commit aspect is embodied to include a dynamic Ramdisk, i.e., an emulator for file based memory allocation storage techniques of the type that typically support disk drive letter mapping, file and subdirectory designations, and the like. Whereas a Ramdisk driver is capable of deleting files permanently, the inventive system releases Ramdisk memory associated with files which are deleted, thus providing a permanent change that also results in newly available memory capacity.

According to a preferred embodiment, the invention employs a powerful file access restriction manager that governs the extent to which certain file operations can be effected on files located on write protected volumes. This restriction manager supports certain flags associated with files or subdirectories for storing and indicating the status of the files or subdirectories with respect to their write protection status when an opportunity arises in which the respective files might be written to a protected volume.

The inventive write filter comprises a kernel-mode part that functions both as a file system filter driver and a volume filter driver or block device filter driver. As to software architecture, the write filter of the invention is logically located above file systems and between the file systems and the class of drivers that interface with physical disks. This placement applies also to the Ramdisk aspects, wherein a quantity of RAM capacity is used to emulate operation of physical disk drivers. The user-mode part of the write filter of the invention comprises a dynamic-link library used by applications to control write filter functionality as explained above.

According to one embodiment, the invention is applied to a Windows XP embedded system, as advantageously used in a thin client terminal that typically lacks a hard drive. This is accomplished by removing and replacing the Microsoft Enhanced Write Filter ("EWF") for Windows XP embedded. The invention protects the underlying block device from writes by creating an overlay in RAM (Random Access Memory) at boot time. This overlay is represented as overlay 50 in FIG. 1. The processing of blocks that have or have not been written is shown in flowchart form in FIG. 2.

The overlay 50 is established at startup, but preferably is not used initially as a mirror of the protected block. Instead, the overlay provides a store for those blocks for which an operation has been attempted to write to those blocks. When instructions are encountered by the driver to write one or more blocks (normally files or subdirectories) to the block device during run time, the write operation is arranged to direct the written block to the overlay 50 and not to the block device, which remains in its original state.

As a result of overlay 50, there are two versions of the protected block or volume, one being the original block or volume, now protected from write operations and the other being the version established on the overlay, wherein changes can arise due to programmed operation of the CPU 30 according to its programmed instructions and data values, at least some of which now can be read out during memory reference cycles from the overlay 50 in RAM 33.

For blocks that are not written, it is possible to program the file system filter driver and a volume or block filter driver to read normally from the original protected device (such as flash 35) only until a write operation is encountered that would affect the contents of the protected device. The alternative, namely to store a copy of the protected device, is redundant up to the time that a write operation makes it necessary to maintain both an original copy (in the protected block) and the altered one (in overlay 50). For blocks that are never written, it is unnecessary to maintain a copy in the overlay 50. In order to conserve memory capacity, blocks that change as a result of write operations can be redirected to the "overlay" and marked accordingly in the file allocation tables. Blocks that do not change during a write operation are left, as is, on the block device.

When a memory read operation is encountered for any block that has been previously written and thereby has its official content stored in overlay 50, the read operation produces the written data from the overlay and any further writes of the same block again are directed to the overlay. All read operations for blocks that have not changed and been allocated to the overlay 50 are read from the underlying block device, such as the flash memory 35 in FIG. 1.

The write filter of the invention could be arrange to direct written blocks to the overlay only if the contents of the blocks has been changed. However this would impose an overhead to keep track of whether the block was actually changed or simply written back without changes. The write filter of the invention preferably assumes that is a block is being written that its content has changed, and uses the overlay 50 for the official version of that block (e.g., typically a named file or subdirectory) from that point onward.

According to an inventive aspect, the write filter as described includes storage of a flag for the blocks that are written to overlay 50, which flag determines whether or not the respective block is committed to become a permanent change, i.e., to be written at some point to the permanent non-volatile memory such as flash memory 35.

When to make the decision to commit to a particular change is again a matter of programming and according to another aspect the capability is provided to vary how and when a change becomes permanent. For example when writing a particular block to the overlay 50, the programming may be based on sufficient confidence to flag the change immediately as permanent. At some point, preferably at the next orderly shutdown, the changed block is written to the protected block (in the example, to flash memory 35). However, the capability to flag the written blocks as permanent provides the possibility that some changed blocks can become permanent whereas other changed blocks remain temporary.

Changes to blocks are advantageously made permanent or temporary for various logical reasons. A safe revision or update to software can be made permanent at once. A more complex reconfiguration such as a software change to support reconfiguration of hardware might best be tried and tested before being made permanent. Temporary changes to written blocks might be made, for example, for test purposes, and run with the changes for a time sufficient to prove an assumption (e.g., whether the system will be stable), whereupon the change is made permanent. However other changes that might be advantageously made temporarily, for example the name of a certain operator who happens to be using the terminal device, can be written according to the invention without ever being made permanent.

The known Microsoft extended write filter (EWF) provides an option to make all write protect changes permanent by writing all changes to the protected block (e.g., flash 35) at shutdown, or to lose all the write protect changes by not writing them and permitting the unchanged original version still stored in the protected block (flash 35) to be used at the next startup. It is likewise possible according to the present invention to decide to make all changes permanent in such a way.

However the invention, provides an additional capability to flag specific blocks (such as named files, subdirectories, memory addresses, user account data, categories of data such as registry entries, virus definitions, and other identifiable subsets of the memory content) as being committed or not committed to becoming permanent. This capability provides a degree of added versatility and function, particularly in thin client embedded operating system terminals, that is very useful.

The invention has been described with reference to a Windows type operating system but is not limited to that operating system to the exclusion of other popular systems that also can support establishing an overlay for a protected block, directing any written blocks to an overlay and not to the protected block, and supporting identification by a commit flag or other technique a block attribute that determines whether at some point the written block will or will not be made permanent by writing that particular block to the protected block or volume. Also, although the typical choice of when to write the permanent blocks to the protected block or volume is during an orderly shutdown procedure, it is also possible to provide a programmed operation that occurs during time that otherwise would be considered run time, when operations affecting the protected block and/or volume are suspended while changes made and logically committed as permanent are physically made permanent by writing the changed block contents onto the protected block, volume or other storage device.

According to an advantageous embodiment applied to Windows XP embedded, the Windows XP "Defragmentation API" can be used as a routine to map changes affecting file system objects (e.g. files, subdirectory folders, etc.) and to manage the existence of original pristine versions and changed versions located at a different location on a given storage device or on a distinct other block storage device (such as a hard disk drive, a compact flash or removable media, a portion of RAM reserved for the purpose, etc.).

The invention as described has a number of advantages, some or all of which can be employed in embodiments as described above. The invention permits instant commit to a permanent change during runtime, because at any time during runtime, a snapshot of the complete overlay contains all changes and can be written to the underlying block device (such as flash 35). This can be done without the need to reboot the unit, because ongoing operations are already referring to the now re-written files or blocks. The actual writing to the physical underlying block device renders the changes permanent in a physical way but does not change operation in a logical way so no reboot is necessary.

An inventive aspect is the capability of selective commit to making changes permanent, on the level of a file or subdirectory or other identifiable subset of the files that have been written. Whereas during runtime specific files, folders and even parts of the Windows registry can be selectively committed to the underlying block device, without the need to reboot the unit, changes that are advantageously temporary can be made in a manner that distinguishes among types of file objects that have been written, or perhaps distinguishes among specific file objects of the same type but that have different logical implications determined by the programmer.

Although changes to file objects are supported and can be made and marked as temporary or permanent, the invention retains access to the contents of the original underlying block device (e.g., partition, flash memory or the like), and reference can be made during runtime to the original content by invoking an appropriate function of the operating system to effect a read operation on the original file (or subdirectory, etc.) as opposed to the re-written but official version maintained in overlay 50. In one embodiment, this is accomplished by establishing a so called "GATEWAY" folder, or by mapping the underlying block device to a distinct drive letter and preferably using it for read only access.

The embodiment with a special "GATEWAY folder" (called "hwfdest" in a practical embodiment) optionally can provide transparent access to the underlying protected block for read or write operations during runtime. Programmed operations, choices and functions might thus enable reading, changing and writing to the block protected device, for example by trusted system level programs, even at the same time that changes by less trusted applications programs might be subjected to tentative changes and selective write commit requirements as discussed.

In another embodiment, the overlay 50 as described, is provided by replacing a standard Ramdisk driver, for example as in Windows XP embedded, with a Ramdisk driver that operates according to the invention and supports file and subdirectory attributes that are regarded as permanent-commit flag identifiers. A standard Windows Ramdisk implementation allocates a fixed amount of available random access memory to a mapped drive letter, and that fixed amount is allotted to the drive letter whether any of the file space is used or not. When a file is written to the inventive Ramdisk overlay, newly allocated memory is used by files, folders and their corresponding metadata (including the commit flag and potentially other information). This minimizes the size of the overlay to file space that has actually be rewritten. Furthermore, an again unlike a conventional Ramdisk, the invention releases Ramdisk space when a file is deleted, which can be logically regarded as writing the file to a null space.

In an alternative embodiment, the inventive Ramdisk overlay can be preformatted with FAT32 at boot time. In another alternative, the overlay space is formatted with NTFS to take advantage of advanced NTFS features such as distinct file access or file manipulation rights, compression, etc.

The Restriction Manager associated with the invention as described, supports file system access restrictions, including restriction of the various file operations that may be permitted to files (or subdirectories or other blocks). The restrictions and/or authorization rights accorded to executable processes that seek to access the write protected volume (or volumes) can be specified based on each process having potentially distinct access rights. Alternatively and as discussed above, the rights can be distinct based on the processes meeting some categorization that intends to distinguish safer programs or processes thereof, or perhaps system level programs or processes, from those that might be considered more dangerous or less tested, etc.

In one embodiment, for example, programs that entail communications or executable strings or macros and similar processes that are deemed dangerous, are given relatively more limited rights than processes that are more internal such as printing or display processes. Such capabilities can be used to restrict the extent to which viruses or hackers might insert or employ altered processes in an attack, or interfere with virus definitions or other protective bulwarks. On the other hand, the invention is versatile in that other processes that might also entail communications, such as virus definition updates, might be given higher levels of authorization to make improvements on system defenses permanent.

Thus the invention allows programming to establish a sandbox for a browser to operate in a relatively open manner without correspondingly open vulnerability to permanent changes. The invention allows establishing a white list of applications that have authorization to write on the flash, a blacklist to deny such access, and the capability for conditional access for applications that don't fit these extremes.

The invention is not limited to thin client applications, applications that use flash memory for protected volume, or embedded Windows XP. The protected volume can alternatively be a particular area of a hard drive or other storage medium, with some of the same advantages in speed, safety and versatility. Although the actual writing of those changed files or other blocks that have been committed to become permanent is advantageously accomplished at an orderly shutdown, that is not the only time that might be permitted for writing to the protected volume.

When writing to the protected volume, one issue is the possibility that the size of re-written files could differ from the original size of the files. An orderly shutdown procedure can involve reorganizing all the files to remain as permanent files on the protected volume, e.g., by interleaving the newly written versions that may change in size, with the original files and potentially moving the original files in the process. As a matter of efficiency, the original files that are not rewritten could be positioned toward one end of the available memory each time that it becomes necessary to write to the protected volume.

The invention is particularly helpful when attempting to install or reconfigure executable processes because the original or clean version and the revised rewritten version are accessible, and there is no requirement to commit to all or no changes by proceeding through orderly shutdown and reboot processes. By comparison, it may be necessary when using an XP-embedded system that has the Enhanced Write Filter deployed, to reboot repeatedly in order to reach a state that is available according to the invention without rebooting. If new software is installed on and XP-embedded system that commits all changes or no changes to the protected volume, a first reboot may be needed to establish a clean system state (for example before a login has set up options or memory space specific to one user). The software is installed, but due to write protection is embodied in a write protect overlay. An orderly shutdown and further reboot then commits the changes. After that, an unlike the present invention, it was necessary to make permanent all the changes that were involved, preventing any temporary or process specific or other staged introduction of changes on a block specific basis.

Various advantages may accrue to programmers in different situations, based on logical distinctions between categories of the blocks for which changes may be chosen to become permanent or temporary. This discussion is not intended to provide an exhaustive list of applications for the selective commit aspect of the invention, but only to establish the versatile framework from which such advantages arise.

An aspect of the invention wherein the overlay 50 is managed as a variable size Ramdisk is that when a file is deleted or made smaller, additional overlay space is made available at once. This benefit as compared to a fixed size Ramdisk results in more efficient use of available RAM than would otherwise be possible, and potentially extended uptime. The selective nature of committing to making block or files or directories permanent is useful for avoiding reboots during installation of new software or changes or upgrades, but also carries other advantages. For example it is possible to commit to making permanent the image of open files (i.e., files with open file handles such as registry hives, etc.). Instead of updating a nonvolatile startup memory for an embedded system, the invention also can be useful for maintaining an updated backup image of a system.

Figure 3:
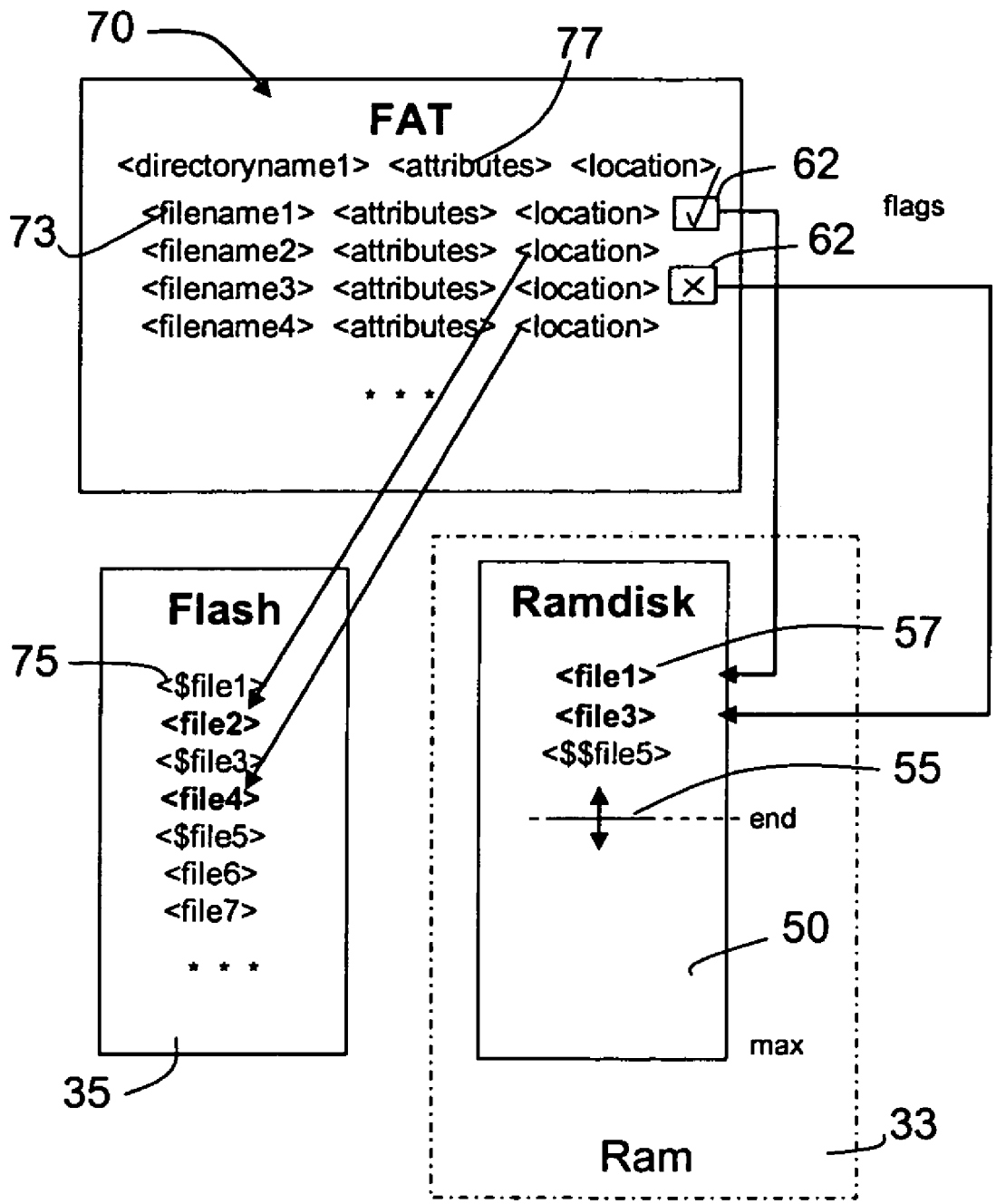
FIG. 3 is a block diagram illustrating additional preferred arrangements wherein the invention is embodied using file allocation tables in a Ramdisk.

FIG. 3 illustrates operation of the invention under control of the file allocation table and Ramdisk attributes of a Windows operating system or the like. According to this embodiment, an information table such as a file allocation table (FAT) 70 cross references the file names, certain attributes and locations of the beginning of various files, subdirectories and the like. There are various ways that a programmer might execute the functions described, and by way of illustration only, one might assume that the first filename is <file 1> and is initially located in flash memory 35. Operations to read the contents of <file 1> can be permitted. If an attempt is made during runtime to write the contents of <file 1> back to flash 35, the file write operation is redirected to overlay 50 in RAM 33. In the example, file 57 is written and identified in FAT 70 as being found at location 57 and has the original file name <file 1>. As a part of this operation, the original <file 1> 75 in flash 35 is renamed, for example by addition of a defined prefix or suffix string, e.g., as <$file 1> such that it is easy to determine the original file name by removing the prefix or suffix.

As shown in FIG. 1, the flag 62 is set or cleared by the restriction manager to indicate the extent to which the rewritten <file 1> is committed to become permanent. Assume for example that due to the processes that effected the write operations for <file 1> and <file 3> as shown, only <file 1> is deemed permanent and <file 3>is not. Appropriate flags 62 can be associated with these files, such as by using a distinct file name prefix or suffix in one of the associated file names, by setting a bit in the attributes 77 in the FAT, etc.

During a subsequent write operation, e.g., during a shutdown procedure, committed file <file 1> then is written over its original values, now renamed <$file 1> and the original file name <file 1> is replaced with the corresponding FAT entry. In the case of uncommitted file <file 3>, the flag indicates that any changes are not deemed permanent. In that case, the original <file 3> is renamed in the flash from <$file 3> to <file 3>.

As also shown in FIG. 3, it is possible that a file might be deleted, such as <file 5>. In that case, an entry is made that identifies a null value for that file, e.g., <$$file 5>. During shutdown, if the null value is committed, then original <file 5> (now renamed <$file 5> to indicate a changed original file name) is likewise deleted. If the null value was not committed as indicated by one or more associated flags 62, the original file name <file 5> is simply replaced.

The foregoing explanation of particular techniques is intended as an illustration of one of many ways in which a programmer could execute the specific steps disclosed in the operational description above.

The inventive application of the invention to a Ramdisk driver, except one of variable size used only for written blocks. For example when <$$file 5> was noted as a null file, the corresponding space in the Ramdisk was reduced, potentially moving the end boundary 55 and clearing space for other uses. It is also possible that a rewritten file could become larger, e.g., by concatenation of additional values. In that event the inventive Ramdisk usage can grow to the maximum defined size as shown in FIG. 3.

The invention is versatile in the commitment to making changes permanent is made on only a subset of the files and blocks that might be read from and written to the flash memory. This substantially reduces the need for RAM compared to maintaining a full protected block image, particularly because in a usual case a modest portion of the flash memory is all that needs to be changed. The available capacity is used only for the potentially new copy wherein the contents have presumably been changed before the block was rewritten, minimizing if not preventing redundant storage of the same content in plural blocks. Preferably, the system permits the Ramdisk to vary up to a predetermined maximum size that can be system or user specified.

Using the optional technique of assigning a gateway directory name or drive letter to the overlay Ramdisk, further versatility is provided for access and potential changes, potentially extending to different levels of block data that corresponds to the original protected block, one or more changes versions and up to one changed version that is specified to become permanent. Using mapping, renaming and file or folder manipulation and attribute selection, the drive letter, "virtual" size and file system type can be changed during runtime. The attributes can permit distinctions between file or subdirectory commit status, distinctions between rights authorized to particular processes and so forth.

The invention has been disclosed in connection with a exemplary embodiments that demonstrate the invention and its representative functions. The invention is not limited to these examples. Reference should be made to the appended claims rather than the discussion of examples in order to determine the scope of the invention in which exclusive rights are claimed.

What is claimed is:

1. A computer system comprising:
    a programmed processor coupled read and write to a protected memory and to a random access memory, wherein the processor is programmed to intercept write operations directed to the protected memory and to maintain in the random access memory a plurality of identified memory blocks containing information that would have been written to the protected memory during said write operations but for interception thereof;
    a memory management process operable to store at least one attribute flag for each of said plurality of identified memory blocks, wherein the flag marks each of said identified memory blocks as committed to become permanent in the protected memory or as not committed to become permanent;
    a memory write process wherein the processor selectively writes to the protected memory or refrains from writing to the protected memory those of said identified memory blocks that are respectively marked by said flag as committed to become permanent or as not to become permanent.

2. The computer system of claim 1, wherein the protected memory comprises a nonvolatile memory from which the random access memory is loaded during a system startup procedure with information governing runtime operations.

3. The computer system of claim 1, wherein the protected memory comprises a nonvolatile memory and the random access memory comprises a volatile memory directly addressed by the processor, loaded with instructions from the nonvolatile memory during a system startup procedure, and including accessible storage space for said identified memory blocks.

4. The computer system of claim 1, wherein the processor is programmed to invoke the memory write process at least during an orderly shutdown procedure in which the memory blocks marked by the flag as committed to become permanent are written to the protected memory and the memory blocks not to become permanent are bypassed.

5. The computer system of claim 4, wherein the programmed processor is embodied as an embedded operating system and the nonvolatile memory comprises one of a flash memory and disk drive.

6. The computer system of claim 3, wherein the protected memory stores a plurality of files used by the processor during the system startup procedure to establish an operating system running substantially on the random access memory.

7. The computer system of claim 6, wherein the operating system maintains a Ramdisk in the random access memory including a file allocation table for files stored in the RAM disk, wherein the identified memory blocks comprise at least one of files, subdirectories and mapped drives, and wherein said file allocation table stores said flag marking the memory blocks as committed or not committed to become permanent.

8. The computer system of claim 7, wherein the flag for each of said memory blocks can differ on a level of at least one of memory addresses, files, subdirectories and mapped drives.

9. The computer system of claim 7, wherein the flag for each of said memory blocks can differ on a level of said files.

10. The computer system of claim 6, further comprising a restriction management process operable to selectively allot rights to processes of said operating system, and wherein the restriction manager permits only selected processes to mark the memory blocks as committed to become permanent via said flags.

11. The computer system of claim 6, wherein the restriction manager is operable to distinguish among processes by at least one of system level processes versus application level processes, internal processes versus processes associated with communications, security processes, and processes having associated authorization requirements.

12. A method for managing a protected memory in a computer system having a programmed processor coupled read and write to a protected memory and to a random access memory, comprising the steps of:
    when a write operation is attempted to an identified block in the protected memory by a runtime process, writing to a block in the random access memory an output of the write operation while keeping on the protected memory an unchanged copy of an affected protected memory block that would have been overwritten by the write operation;
    when either of a read operation and a write operation subsequently is attempted by a further runtime process for the identified block, using the block in the random access memory therefor, continuing to keep the unchanged copy on the protected memory;
    operating a restriction manager process to record, for each said identified block, whether or not the identified block is committed to become a permanent change to the protected memory;

selectively writing to the protected memory at least one of said identified blocks that was committed to become permanent, and bypassing writing of at least one of said identified blocks that was not committed to become permanent.

13. The method of claim 12, wherein the protected memory is a nonvolatile memory and further comprising a startup operation prior to attempting write operations to the protected block, the startup operation including establishing an operating system for the programmed processor in the random access memory, and reserving space in the random access memory for a plurality of said identified blocks.

14. The method of claim 13, wherein said selective writing to the protected memory is accomplished at least during an orderly shutdown procedure.

15. The method of claim 13, comprising maintaining a file allocation system for at least one of the nonvolatile memory and a Ramdisk in the random access memory, and redirecting a file name corresponding to the identified block to the Ramdisk upon an initial occurrence of said attempted write operation, whereupon subsequent read and write operations are directed to said Ramdisk.

16. The method of claim 15, further comprising maintaining a file attribute for each said file name in the Ramdisk for flagging using the restriction manager whether or not a corresponding said identified block is committed to become permanent, and wherein said file attribute is referenced in said selectively writing to the protected memory.

17. The method of claim 13, comprising reserving in the random access memory a Ramdisk portion having an indefinite size up to a maximum defined size, maintaining a file allocation system for at least one of the nonvolatile memory and a Ramdisk in the random access memory, and redirecting a file name corresponding to the identified block to the Ramdisk upon an initial occurrence of said attempted write operation, whereupon subsequent read and write operations are directed to said Ramdisk, and wherein the Ramdisk increases and decreases in actual size as write operations and file deletions occur.

18. The method of claim 17, further comprising operating the restriction manager to mark one of said identified blocks that are to become permanent and said identified blocks that are not to become permanent, and distinguishing between said identified blocks on a level of at least one of memory addresses, files, subdirectories and mapped drives.

19. The method of claim 17, further comprising operating the restriction manager to mark one of said identified blocks that are to become permanent and said identified blocks that are not to become permanent, and distinguishing between said identified blocks based on categorization of the identified blocks by content type.

20. The method of claim 17, further comprising operating the restriction manager to mark one of said identified blocks that are to become permanent and said identified blocks that are not to become permanent, and distinguishing between said identified blocks based on categorization of a process that attempted at least one said write operation.

21. A computer readable medium containing software embodying the method of claim 12.

* * * * *

UNITED STATES PATENT AND TRADEMARK OFFICE
CERTIFICATE OF CORRECTION

PATENT NO.        : 7,395,394 B2                          Page 1 of 1
APPLICATION NO.   : 11/347692
DATED             : July 1, 2008
INVENTOR(S)       : Norbert Federa et al.

It is certified that error appears in the above-identified patent and that said Letters Patent is hereby corrected as shown below:

Title Page;
In paragraph (75) of the front page, add inventors "Bogdan Dumitru Hobeanu, Ramnicu Valcea (RO); Razvan Andrei Hobeanu, Ramnicu Valcea (RO)", therefor.

Signed and Sealed this
Eleventh Day of October, 2011

David J. Kappos
*Director of the United States Patent and Trademark Office*